US011676313B2

(12) United States Patent
Sandsmark et al.

(10) Patent No.: US 11,676,313 B2
(45) Date of Patent: *Jun. 13, 2023

(54) GENERATING VECTOR GRAPHICS BY PROCESSING RASTER GRAPHICS

(71) Applicant: Remarkable AS, Oslo (NO)

(72) Inventors: Martin Tobias Holmedahl Sandsmark, Oslo (NO); Gunnar Sletta, Bergen (NO)

(73) Assignee: reMarkable AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 17/500,897

(22) Filed: Oct. 13, 2021

(65) Prior Publication Data
US 2022/0044456 A1 Feb. 10, 2022

Related U.S. Application Data

(63) Continuation of application No. 16/995,564, filed on Aug. 17, 2020, now Pat. No. 11,158,097.

(60) Provisional application No. 62/888,996, filed on Aug. 19, 2019.

(51) Int. Cl.
*G06T 11/20* (2006.01)

(52) U.S. Cl.
CPC ........ *G06T 11/203* (2013.01); *G06T 2210/56* (2013.01)

(58) Field of Classification Search
None
See application file for complete search history.

(56) References Cited

U.S. PATENT DOCUMENTS

2007/0216689 A1* 9/2007 Stamm ................... G06T 11/40
345/469

* cited by examiner

*Primary Examiner* — Jeffrey J Chow
(74) *Attorney, Agent, or Firm* — Fenwick & West LLP

(57) ABSTRACT

One embodiment of a disclosed system, method, and computer readable storage medium which includes an algorithm for generating a vector graphic based on a raster graphic input. A tablet scribe system identifies a boundary of a raster graphic image. The boundary is comprised of contrasting pixels in the raster graphic. The system determines a slope for each line segment of the raster graphic boundary. Based on a comparison of the slope for the adjacent line segments, the system generates a contour replaces line segments with equivalent slopes wherein each line segments represents a point on the contour. The system condenses the contour by removing redundant points on the contour based on their position relative to neighboring points and converts the edges of one or more remaining line segments into continuous curves on the contour.

17 Claims, 8 Drawing Sheets

GENERATING VECTOR GRAPHICS BY PROCESSING RASTER GRAPHICS

CROSS REFERENCE TO RELATED APPLICATION

This application is a continuation of U.S. application Ser. No. 16/995,564, filed Aug. 17, 2020, which claims the benefit of U.S. Provisional Application No. 62/888,996, filed Aug. 19, 2019, which are incorporated by reference in their entirety.

TECHNICAL FIELD

The disclosure relates generally to computer graphics, and more specifically to a method for generating vector graphics.

BACKGROUND

Raster graphics refer to images composed of colorized dots, or pixels, laid out in a two-dimensional grid, for example on a computer screen or a digital photograph. In comparison, vector graphics refer to a mathematical description of graphical shapes, for example lines, rectangles, circles, splines, triangle, etc. Vector graphics may also be associated with visual properties, for example dimensions, colors, fill, etc. Converting vector graphics into raster graphics for presentation on a computer screen is a common and well-understood problem. However, vector graphics represent most fonts used in computer systems and form the basis of many commonly used file formats (e.g., PDF and SVG). Accordingly, there exists a need for a technique for converting raster graphics into vector graphics by generating a mathematical representation of shapes based on raster input.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. Overview

Disclosed is a configuration (including a system, a process, as well as a non-transitory computer readable storage medium storing program code) for generating mathematical representations of shapes based on raster inputs. In one embodiment, the configuration includes, for example, a depixelator module configured to generate mathematical representations of shapes based on raster inputs. Raster graphics refer to a combination of pixels, for example pixels of a black and white image. In comparison to conventional systems that converted colored images into raster graphics, the system disclosed herein converts monochrome images with textured lines into vector graphics.

Figure 1A:
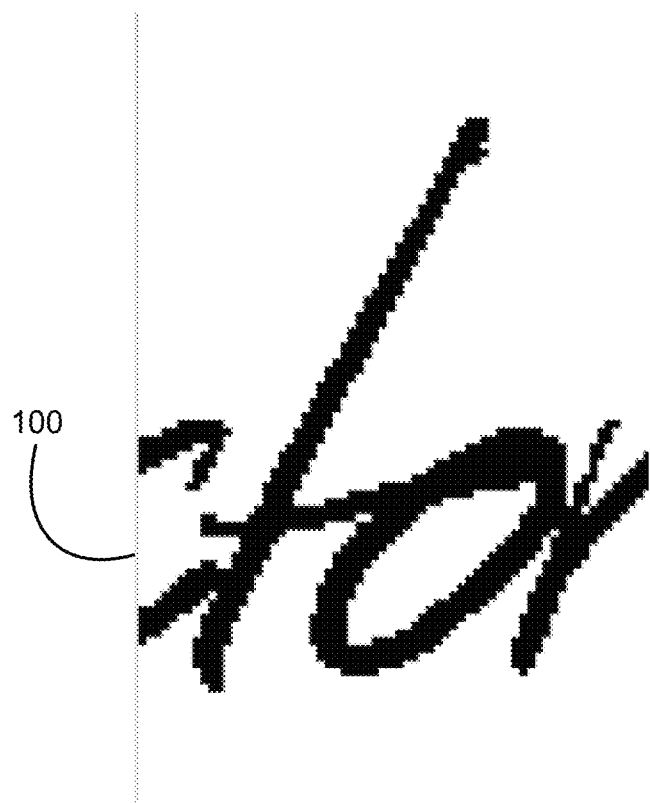
FIG. 1A-B illustrate example representations of a raster graphic and a vector graphic, according to one embodiment.
Figure 1B:
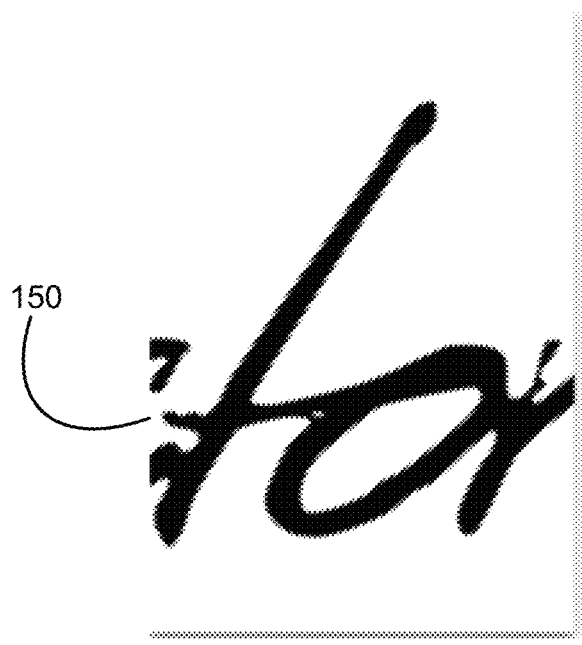

FIG. 1A illustrates a representation of a raster graphic 100, according to one embodiment. As shown in the illustrated example, the edges outlining a raster graphic are displayed as having segmented, horizontal and vertical edges comprised of several individual line segments. When displayed to a user, for example via a computer screen, raster graphics are displayed with a jaggedness typically associated with lower resolution images. To increase the resolution of an image, the disclosed configuration includes a computer component (eg., a depixelator module) configured to convert a raster graphic into a vector graphic by contouring the edges to trace an outline of the raster graphic. FIG. 1B illustrates a representation of a vector graphic, according to one embodiment. The illustrated vector graphic is a converted representation of the raster graphic illustrated in FIG. 1A. As shown in the illustrated example, the trace of the edges in FIG. 1B is a contour of the edges shown in FIG. 1A.

II. System Configuration

The tablet scribe device 210 receives gesture inputs from the input mechanism 220, for example, when the input mechanism 220 makes physical contact with a contact-sensitive surface (e.g., the touch-sensitive screen) on the tablet scribe device 210. Based on the contact, the tablet scribe device 210 generates and executes instructions for updating content displayed on the contact-sensitive screen to reflect the gesture inputs. For example, in response to a gesture transcribing a verbal message (e.g., a written text or a drawing), the tablet scribe device 210 updates the contact-sensitive screen to display the transcribed message. As another example, in response to a gesture selecting a navigation option, the tablet scribe device 210 updates the screen to display a new page associated with the navigation option.

The input mechanism 220 refers to any device or object that is compatible with the contact-sensitive screen of the tablet scribe device 210. In one embodiment, the input mechanism 220 may work with an electronic ink (e.g., E-ink) contact-sensitive screen. For example, the input mechanism 220 may refer to any device or object that can interface with a screen and, from which, the screen can detect a touch or contact of said input mechanism 220. Once the touch or contact is detected, electronics associated with the screen generate a signal which the tablet scribe device 210 can process as a gesture that may be provided for display on the screen. Upon detecting a gesture by the input mechanism 220, electronics within the contact-sensitive screen generate a signal that encodes instructions for displaying content or updating content previously displayed on the screen of the tablet scribe device 210 based on the movement of the detected gesture across the screen. For example, when processed by the tablet scribe device 210, the encoded signal may cause a representation of the detected gesture to be displayed on the screen of the tablet scribe device 210, for example a scribble.

In some embodiments, the input mechanism 220 is a stylus or another type of pointing device. Alternatively, the input mechanism 220 may be a part of a user's body, for example a finger.

In one embodiment, the input mechanism 220 is an encased magnetic coil. When in proximity to the screen of the tablet scribe device 210, the magnetic coil helps generate a magnetic field that encodes a signal that communicates instructions, which are processed by the tablet scribe device 210 to provide a representation of the gesture for display on the screen, e.g., as a marking. The input mechanism 220 may be pressure-sensitive such that contact with the contact-sensitive display causes the magnetic coil to compress. In turn, the interaction between the compressed coil and the contact-sensitive screen of the tablet scribe device 210, may generate a different encoded signal for processing, for example, to provide for display a representation of the gesture on the screen that has different characteristics, e.g., thicker line marking. In alternate embodiments, the input mechanism 220 include a power source, e.g., a battery, that can generate a magnetic field with a contact-sensitive surface. It is noted that the encoded signal is a signal that is generated and may be communicated. The encoded signal may have a signal pattern that may be used for further analog or digital analysis (or interpretation).

In one embodiment, the contact-sensitive screen is a capacitive touchscreen. The screen may be designed using a glass material coated with a conductive material. Electrodes, or an alternate current carrying electric component, are arranged vertically along the glass coating of the screen to maintain a constant level of current running throughout the screen. A second set of electrodes are arranged horizontally. The matrix of vertical active electrodes and horizontal inactive electrodes generates an electrostatic field at each point on the screen. When an input mechanism 220 with conductive properties, for example the encased magnetic coil or a human finger, is brought into contact with an area of the screen of the tablet scribe device 210, current flows through the horizontally arranged electrodes, disrupting the electrostatic field at the contacted point on the screen. The disruption in the electrostatic field at each point that a gesture covers may be measured, for example as a change in capacitance, and encoded into an analog or digital signal.

In an alternate embodiment, the contact-sensitive screen is a resistive touchscreen. The resistive touch screen comprises two metallic layers: a first metallic layer in which striped electrodes are positioned on a substrate, for example a glass or plastic and a second metallic layer in which transparent electrodes are positioned. When contact from an input mechanism, for example a finger, stylus, or palm, is made on the surface of the touchscreen, the two layers are pressed together. Upon contact, a voltage gradient is applied to the first layer and measured as a distance by the second layer to determine a horizontal coordinate of the contact on the screen. The voltage gradient is subsequently applied to the second layer to determine a vertical coordinate of the contact on the screen. The combination of the horizontal coordinate and the vertical coordinate register an exact location of the contact on the contact-sensitive screen. Unlike capacitive touchscreens which rely on conductive input mechanisms, a resistive touchscreen is configured to sense contact from nearly any input mechanism. Although some embodiments of the scribe device are described herein with reference to a capacitive touchscreen, one skilled in the art would recognize that a resistive touchscreen could also be implemented.

In an alternate embodiment, the contact-sensitive screen is an inductive touchscreen. An inductive touchscreen comprises a metal front layer that is configured to detect deflections when contact is made on the screen by an input mechanism. Accordingly, an inductive touchscreen is configured to sense contact from nearly any input mechanism. Although some embodiments of the scribe device are described herein with reference to a capacitive touchscreen, one skilled in the art would recognize that alternative touchscreen technology may be implemented, for example, an inductive touchscreen could also be implemented.

The cloud server 230 is configured to receive information from the tablet scribe device and/or communicate instructions to the tablet scribe device 210. As illustrated in FIG. 1, the cloud server 230 may comprise a cloud data processor 250 and a data store 260. Data recorded and stored by the tablet scribe device 210 may be communicated to the cloud server 230 for storage in the data store 260. For example, the data store 260 may store documents, images, or other types of content generated or recorded by a user through the tablet scribe device 210. In some embodiments, the cloud data processor 250 monitors the activity and usage of the tablet scribe device 210 and communicates processing instructions to the tablet scribe device 210. For example, the cloud data processor 250 may regulate synchronization protocols for data stored in the data store 260 with the tablet scribe device 210.

Interactions between the tablet scribe device 210 and the cloud server 230 are typically performed via the network 240, which enables communication between the tablet scribe device 210 and the cloud server 230. In one embodiment, the network 240 uses standard communication technologies and/or protocols including, but not limited to, links using technologies such as Ethernet, 802.11, worldwide interoperability for microwave access (WiMAX), 3G, 4G, LTE, digital subscriber line (DSL), asynchronous transfer mode (ATM), InfiniBand, and PCI Express Advanced Switching. The network 240 may also utilize dedicated, custom, or private communication links. The network 240 may comprise any combination of local area and/or wide area networks, using both wired and wireless communication systems.

Figure 3:
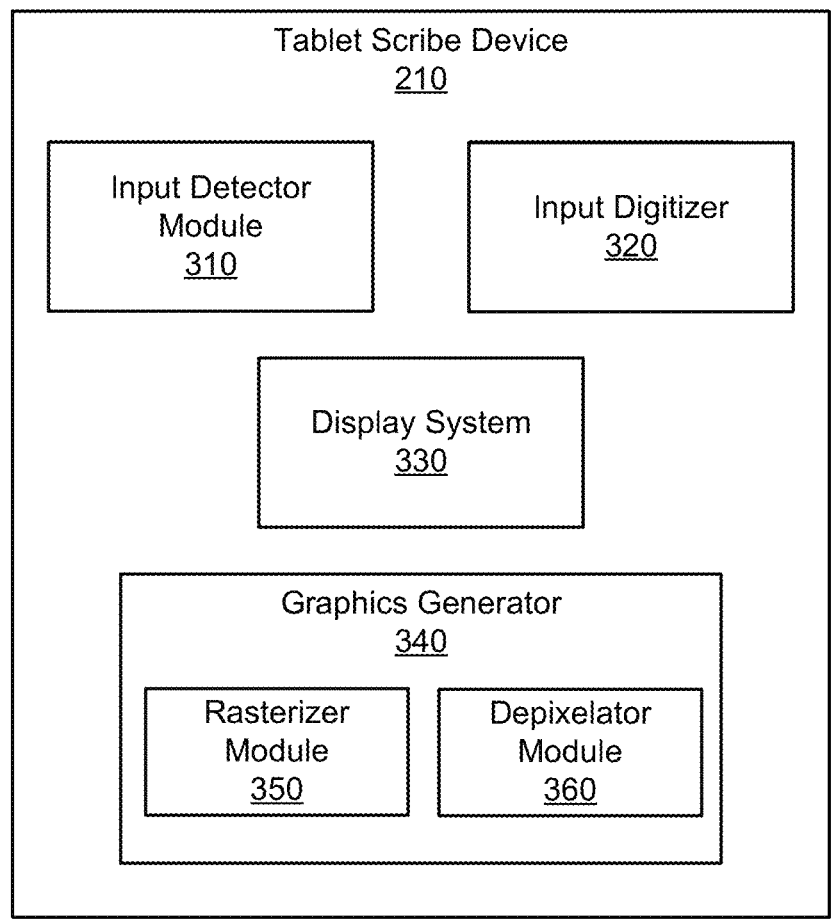
FIG. 3 is a block diagram of the system architecture of a tablet scribe device, according to one example embodiment.

FIG. 3 is a block diagram of the system architecture of a tablet scribe device, according to one example embodiment. In the embodiment illustrated in FIG. 3, the tablet scribe device 210 comprises an input detector module 310, an input digitizer 320, a display system 330, and a graphics generator 340.

The input detector module 310 may be configured to recognize that a gesture has been or is being made on the screen of the tablet scribe device 210. The input detector module 310 refers to electronics integrated into the screen of the tablet scribe device 210 that are configured to interpret an encoded signal generated by contact between the input mechanism 220 and the screen into a recognizable gesture. To do so, the input detector module 310 may evaluate properties of the encoded signal to determine whether the signal represents a gesture made intentionally by a user or a gesture made unintentionally by a user.

The input digitizer 320 may be configured to convert the analog signal encoded by the contact between the input mechanism 220 and the screen into a digital set of instructions. The converted digital set of instructions may be processed by the tablet scribe device 210 to generate or update a user interface displayed on the screen to reflect an intentional gesture.

The display system 330 may include the physical and firmware (or software) components to provide for display (e.g., render) on a screen a user interface. The user interface may correspond to any type of visual representation that may be presented to or viewed by a user of the tablet scribe device 210.

Based on the digital signal generated by the input digitizer 230, the graphics generator 340 may be configured to generate or update graphics of a user interface to be displayed on the screen of the tablet scribe device. The display system 240 may be configured to present those graphics of the user interface for display to a user using electronics integrated into the screen.

When an input mechanism 220 makes contact with a contact-sensitive screen of a tablet scribe device 210, the input detector module 310 recognizes a gesture has been made through the screen. The gesture may be recognized as a part of an encoded signal generated by the compression of the coil in the input mechanism 220 and/or corresponding electronics of the screen of the display system 330. The encoded signal is transmitted to the input detector module 310, which evaluates properties of the encoded signal in view of at least one gesture rule to determine whether the gesture was made intentionally by a user. If the input detector module 310 determines that the gesture was made intentionally, the input detector module 310 communicates the encoded signal to the digitizer output 220. The encoded signal is an analog representation of the gesture received by a matrix of sensors embedded in the screen of the device 220.

In one example embodiment, the input digitizer 320 translates the physical points on the screen that the input mechanism 220 made contact with into a set of instructions for updating the what is provided for display on the screen. For example, if the input detector module 310 detects an intentional gesture that swipes from a first page to a second page, the input digitizer 320 receives the analog signal generated by the input mechanism 220 as it performs the swiping gesture. The input digitizer 320 generates a digital signal for the swiping gesture that provides instructions for the display system 330 of the tablet scribe device 210 to update the user interface of the screen to transition from, for example, a current (or first page) to a next (or second page, which may be before or after the first page).

In one example embodiment, the graphics generator 340 receives the digital instructional signal (e.g., swipe gesture indicating page transition (e.g., flipping or turning) generated by the input digitizer 320. The graphics generator 340 generates graphics or an update to the previously displayed user interface graphics based on the received signal. The generated or updated graphics of the user interface are provided for display on the screen of the tablet scribe device 210 by the display system 330, e.g., displaying a transition from a current page to a next page to a user. In the displayed embodiment of the FIG. 3, the graphics generator 340 comprises a rasterizer module 350 and a depixelator module 360. Input gestures drawn by a user on a contact-sensitive surface are received as vector graphics and are input to the rasterizer module 350. The rasterizer module 350 converts the input vector graphics to raster graphics, which can be displayed (or provided for display) on the contact-sensitive surface. The depixelator module 360 may apply image processing techniques to convert the displayed raster graphics back into vector graphics, for example to improve processing power of the tablet scribe device 210 and to conserve memory of the tablet scribe device 210. In one implementation, the depixelator module 360 may convert a displayed raster graphic back to a vector graphic when exporting content displayed on the screen into a different format or to a different system. As will be discussed with reference to FIGS. 4-9, the generation of a vector graphic from a raster graphic may include the removal of points on the boundary of the raster graphic, which reduces the space required to store the graphic in memory.

III. Converting Raster Graphics into Vector Graphics

Figure 4:
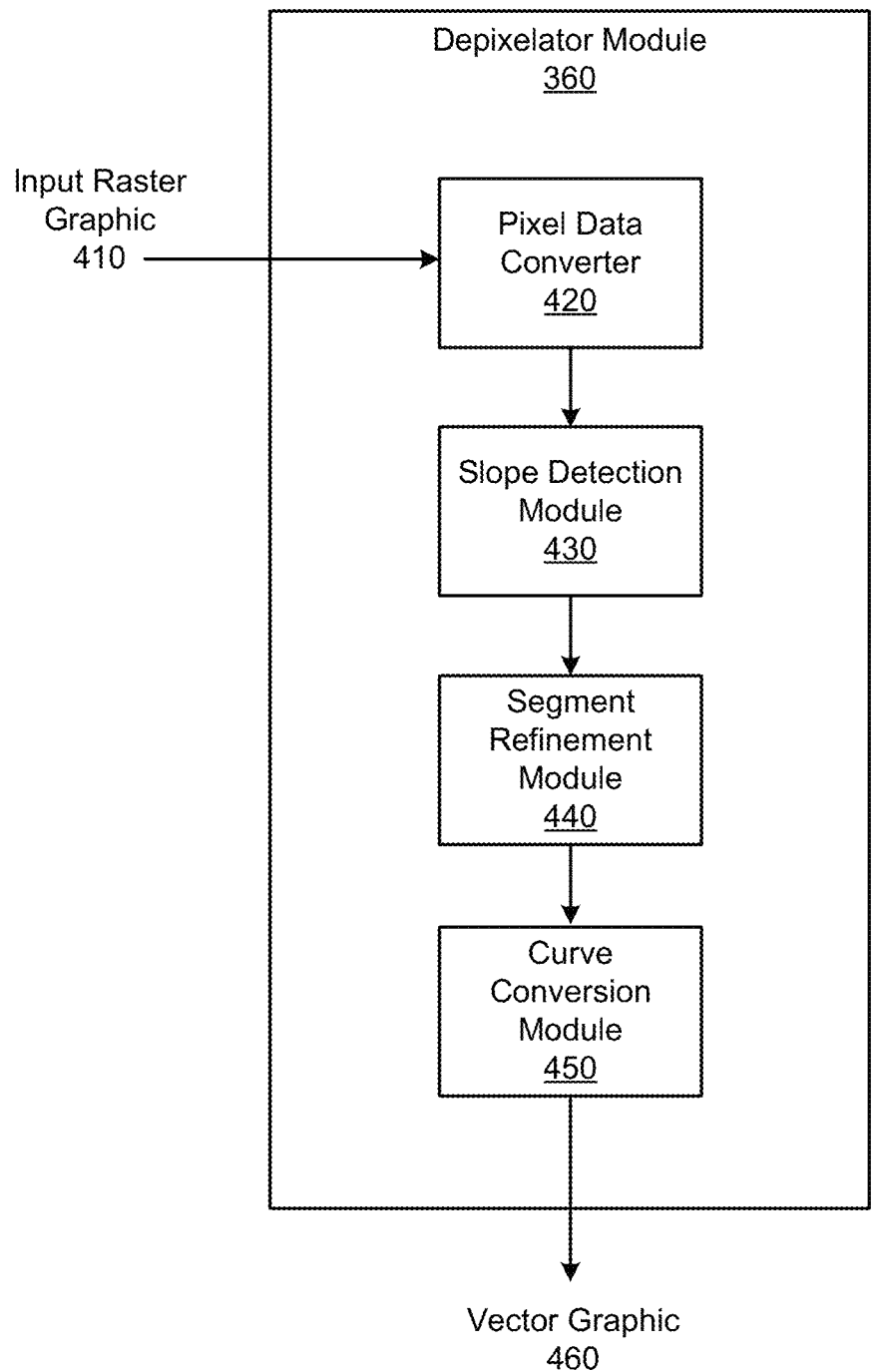
FIG. 4 is a block diagram of the system architecture of a depixelator, according to one embodiment.

FIG. 4 is a block diagram of an example system architecture of the depixelator module 360, according to one embodiment. The depixelator module 360 includes a pixel data converter 420, a slope detection module 430, a segment refinement module 440, and a curve conversion module 450. In some embodiment, the depixelator module 360 includes additional modules or components to perform the same functionalities described below.

The pixel data converter 420 receives an input raster graphic 410, for example the raster graphic illustrated in FIG. 1A, and converts the raster graphic into pixel data. Using the pixel data, the pixel data converter 420 traces the contours of shapes. For each pixel of the converted pixel data, the pixel data converter 420 identifies a line segment that is part of a boundary outlining the graphic 410. The identified line segment may be a horizontal, vertical, or diagonal segment of varying lengths. As described herein, the boundary distinguishes between a set of contrasting pixels in a raster graphic. For example, on one edge of the boundary are black or shaded pixels that are part of the graphic 410 and on the other edge of the boundary are contrasting, white pixels that represent the background of the screen on which the graphic 410 was drawn. In one implementation, the pixel data converter 320 implements a Marching Squares algorithm to identify a separate line segment for each pixel of the input raster graphic.

The slope detection module 430 analyzes the slope of each identified line segment to convert line segments of the boundary into contours representing the outline of the original raster graphics. The slope detection module 430 determines the slope of the line segments and compares the slope and displacement between each set of adjacent or neighboring line segments. Based on the comparison of each set of adjacent/neighboring segment, the slope detection module 430 identifies line segments with slopes within a threshold level of similarity.

The segment refinement module 440 generates a contour line, which is overlaid or positioned in place of adjacent line segments identified as having similar slopes. Accordingly, the segment refinement module 440 may implement an algorithm to generate a single contour to replace the identified segments. The implemented algorithm may be tuned based on at least one of the following conditions: a threshold amount of smoothing required to generate a contour for a raster graphic and a number of iterations required for the implemented algorithm to achieve the threshold amount of smoothing. In some embodiments, both conditions are defined manually or may be determined by training a model over a training period. In other embodiments, the algorithm may be tuned based on additional conditions than those listed above.

In some example embodiments, despite generating a contour to replace the line segments of bounding the raster graphic input 410, a contour may still include segments with pointed edges. Accordingly, the curve conversion module 450 converts any remaining line segments in the generated contour into a continuous curve. In one embodiment, the curve conversion module 450 implements an algorithm which constructs cubic Bezier spline segments.

As an example, the slope detection module 430 may identify a first line segment with a slope representing a shift of two points to the left and one point up, a second horizontal line segment branching left from the first line segment, and a third line segment branching from the segment line segment also with a slope representing a shift of two pixels to the left and one pixel up. Since the first and third segments have equivalent slopes shifted horizontally by the second segment, the slope detection module 430 may generate instructions for the segment refinement module to generate a contour line based on the first, second, and third segment. Based on the detected slopes of line segments, the segment refinement module 440 generates a contour line overlaying or in place of the first, second, and third segments.

The slope detection module 430 may compare the difference in slopes of each neighboring or adjacent segment and a target segment to a threshold and replace segments having slopes within the threshold with a single contour line. A slope above a threshold difference from the target slope may be converted into a separate, distinct contour line that is connected to other contour lines traced over the boundary.

The segment refinement module 440 may analyze the slope of neighboring segments. In one embodiment where each neighboring segment of a group of segments has a slope that is within a threshold slope, the segment refinement module 440 identifies a center point within each neighboring segment and generates a single contour line that connects each of the center points. In another embodiment, the segment refinement module 440 applies an iterative algorithm to gradually adjust points lying on the outline to more closely resemble a continuous shape. In such an embodiment, the segment refinement module 440 identifies a point on a target segment (i), and a point on immediately adjacent segments on either side of the target segment, (i+1) and (i−1). The segment refinement module 440 generates a centerline between the segments i, i+1, and i−1 and maps the position of each point within a threshold distance of the centerline to a point on the centerline. The segment refinement module 440 generates a contour line representing the boundary along segments i, i+1, and i+2 based on the mapped points along the centerline.

In some embodiments where a contour line includes a large dataset of points, some of those points may be positioned in a straight line. Because points provide no insight inot the direction or curvature of the contour, so the segment refinement module 440 condenses the number of points included in the contour by reducing the number of points along the straight line. For example, several points may lie along a contour line including a first, second, third, fourth, and fifth point, of which the second, third, and fourth points lie on a straight-line relative to each other. Given that the contour line need only travel through one of the second, third, and fourth points to travel through the remaining two, two of the three points can be removed without impacting the shape or orientation of the contour line. Accordingly, the segment refinement module 440 removes, for example the second and fourth points, such that the contour only includes the first, third, and fifth points. In one embodiment, the segment refinement module 440 implements a Ramer-Douglas-Peuker end-point fit algorithm to remodel a contour composed of line segments as a similar curve with fewer points.

To generate curves along a contour line, the curve conversion module 450 may determine a tangent line at each remaining point p along the contour line based on two neighboring points adjacent to each point p. The curve conversion module 450 inserts a first spline control point backward along the tangent at a distance proportional to the distance to the previous point on the curve and a second spline control point forward along the tangent at a distance proportional to the distance to the next point in the curve. The curve conversion module 450 transforms the segment into a curve by connecting each spline control point with the existing points on the contour. The resulting contour is a vector graphic 460 bounded by a contoured outlined of the pixelated raster graphic input 410.

IV. Example Conversion to a Vector Graphic

Figure 5A:
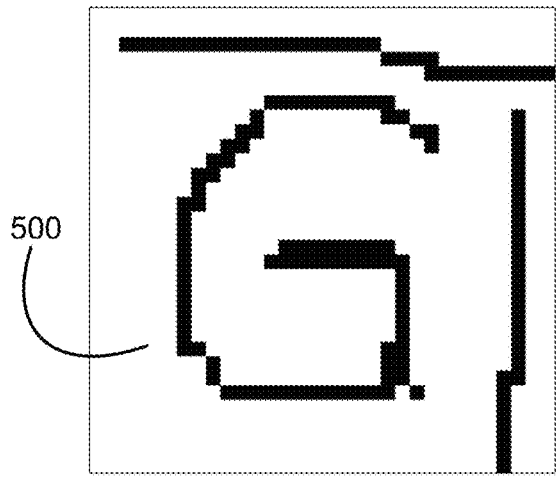
FIG. 5A illustrates an example image that is input to the depixelator, according to one embodiment.

As described, a raster graphic refers to a combination of pixels forming a black and white image outlined by connections between various line segments. FIG. 5A illustrates an example representation of a raster graphic 500, according to one embodiment. In comparison, a vector graphic refers to an image outlined by contour lines traced over the pixels forming the raster graphic of the same image. FIG. 4B illustrates an example representation of a raster graphic 550, according to one embodiment.

Figure 5B:
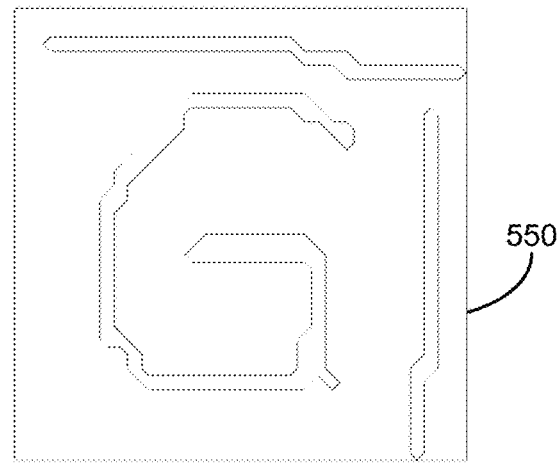
FIG. 5B illustrates a set of contours traced from the example image, according to one embodiment.
Figure 6A:
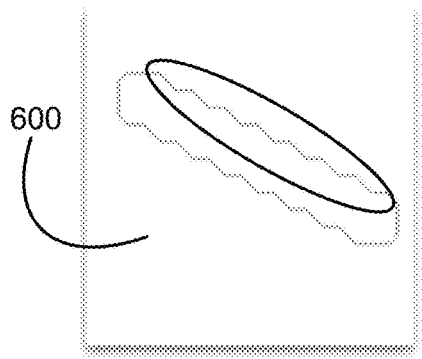
FIGS. 6A-B illustrate a set of line segments generated based on an example image and the same image modified using slope detection techniques, according to one embodiment.
Figure 6B:
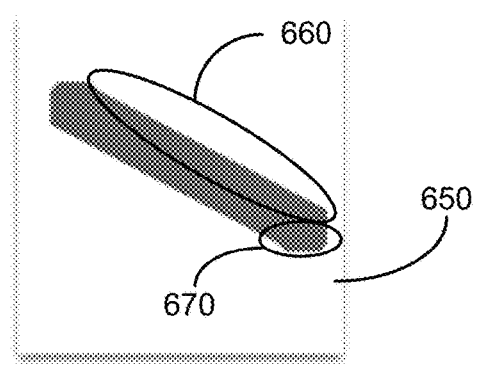

The pixel data converter 420 receives, as input, a raster graphic input 410 to be converted into a vector graphic and defines the boundary of the image using line segments of each pixel of the image. FIG. 5A illustrates a set of line segments 500 generated based on the received raster graphic input, according to one embodiment. As described above, the image 500 is bounded by a plurality of adjoined line segments, each of which represents an edge of a pixel of the raster graphic input 410. The slope detection module 430 compares the slope of each line segment to the slopes of other segments. FIG. 5B illustrates an image with a contoured boundary 550 generated based on the comparison of each slope to slopes of other segments, according to one embodiment.

Figure 7:
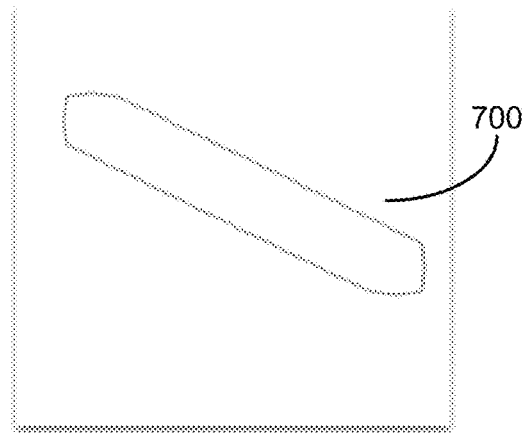
FIG. 7 illustrates the example image modified by segment refinement techniques, according to one embodiment.

In the illustrated image 1000, one diagonal edge of the image 1000 (e.g., the circled edge) is characterized by segments with a common slope m. The segment refinement module 340 generates a contour line based on a comparison of the slopes of each segment. Accordingly, in the contoured image 650, the same edge is represented as a single contour for a region 660 in place of the segments with slope m. However, a single contour may not be sufficient to cover the entire boundary of an image. For example, the difference between the average slope of a segment in the region 660 and the average slope of a segment in the region 670 may be greater than a threshold difference. Accordingly, the segment refinement module 440 may determine a second contour to replace segments in the region 670. FIG. 7 illustrates an image 700 with a complete contoured boundary, according to one embodiment.

Figure 8A:
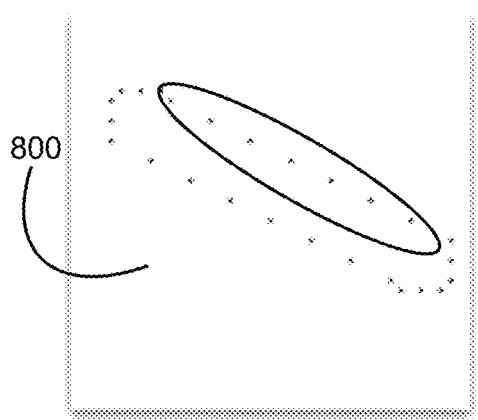
FIG. 8A-B illustrates a set of points generated based on the image and the same image with a reduced set of points, according to one embodiment.
Figure 8B:
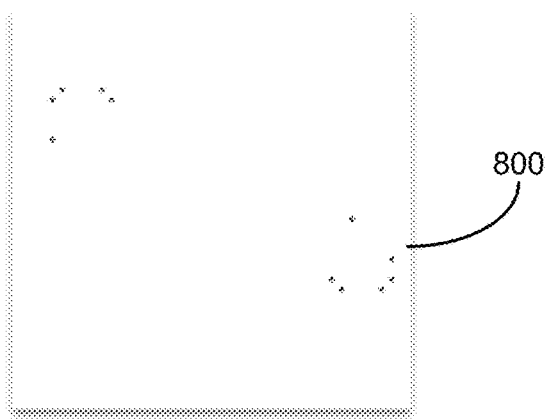

The segment refinement module 440 may identify redundant points along a contour. FIG. 8A illustrates an image 800 in which a contour comprises a set of points, according to one embodiment. The circled set of points in FIG. 8A represent a set of points lying on a straight line. Accordingly, the circled set of points include at least one redundant point. As described above, the segment refinement module 440 removes a number of points within the circled region. FIG. 8B illustrates an image with a contour comprised of a reduced set of points, according to one embodiment. The points removed from the circled region in FIG. 8A result in the outline of the image 800 illustrated in FIG. 8B.

Figure 9A:
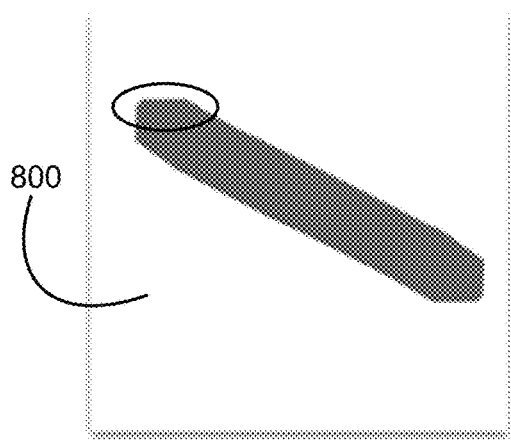
FIG. 9A-B illustrates a set of line segments generated based on the image and the same image with curved edges, according to one embodiment.
Figure 9B:
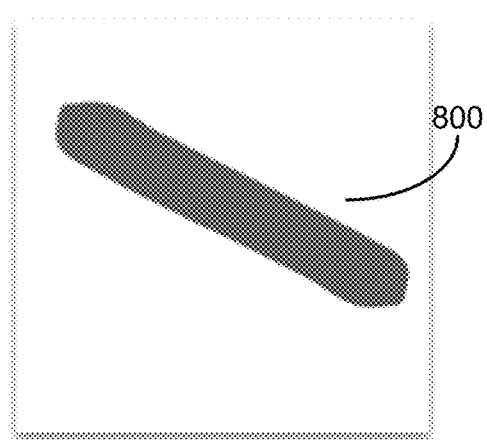

The curve conversion module 450 converts any remaining line segments in the generated contour into a continuous curve. FIG. 9A illustrates an image which a contoured boundary of an image includes remaining line segments to be converted. The circled set of segments in FIG. 9A represent the set of segments to be converted into curves fit to the contour. Accordingly, the curve conversion module 450 converts the segments into a curve, for example using an end-point fit algorithm. FIG. 9B illustrates a complete vector graphic with curved edges and a complete contoured boundary.

It is noted that the described modules may be embodied as software (or firmware) as program code comprised of instructions. The program code is executable by a processing system. In general, the modules may be configured to operate with a processing system that may include one or more processors and/or controllers. The processing system also may have a storage, e.g., a memory, where the program code may be stored in whole or in parts. The program code also may be stored and/or executed through hardware configurations such as field programmable gate arrays, application specific integrated circuits (ASICs), and/or specialized electronic circuitry.

V. Example Computing Machine Architecture

Figure 10:
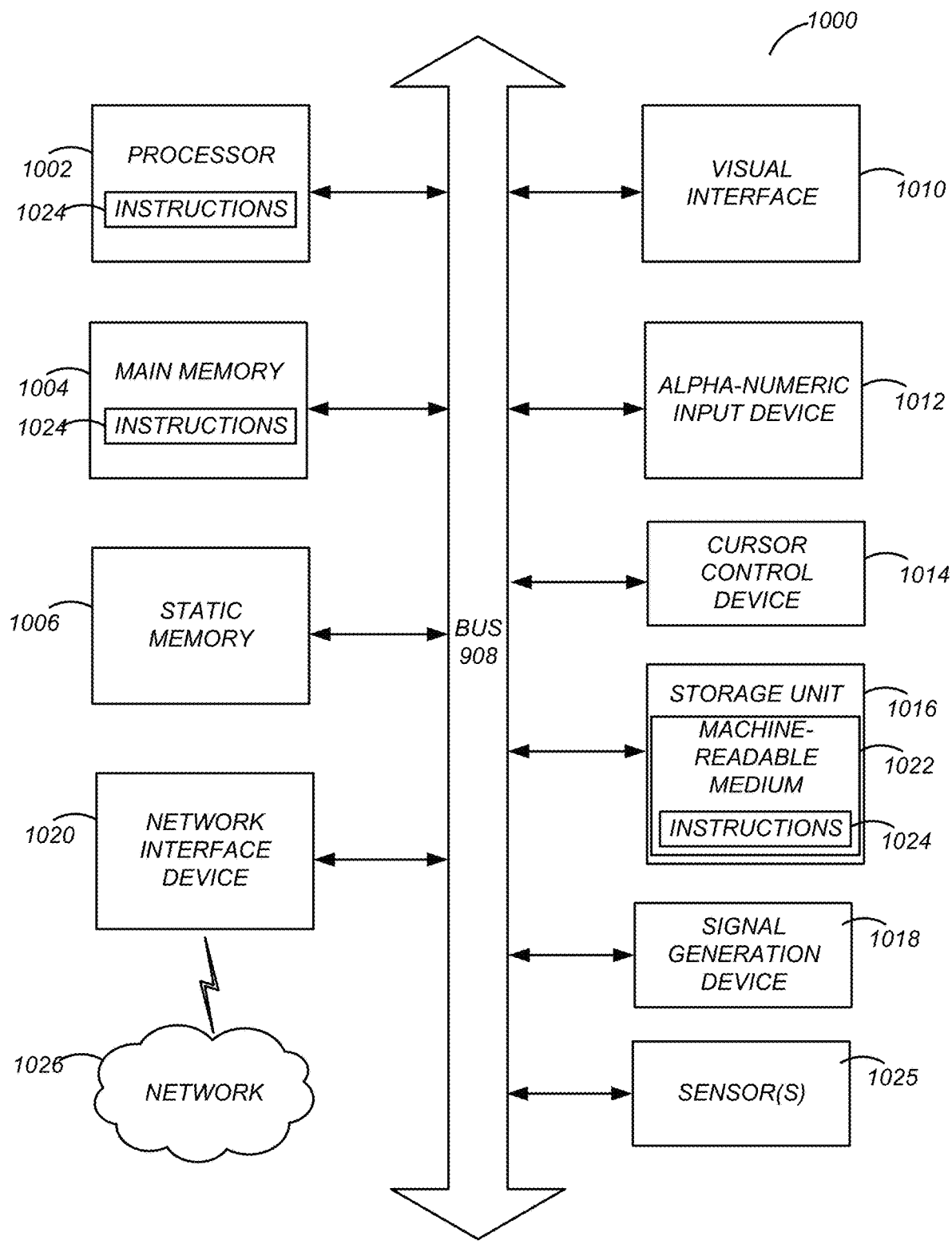
FIG. 10 is a block diagram illustrating components of an example machine able to read instructions from a machine-readable medium and execute them in a processor (or controller), according to one embodiment.

FIG. 10 is a block diagram illustrating components of an example machine able to read instructions from a machine-readable medium and execute them in a processor (or controller), according to one embodiment. FIG. 10 is an example of a processing system, of which a some of the described components or all of the described components may be leveraged by the modules described herein for execution.

Figure 2:
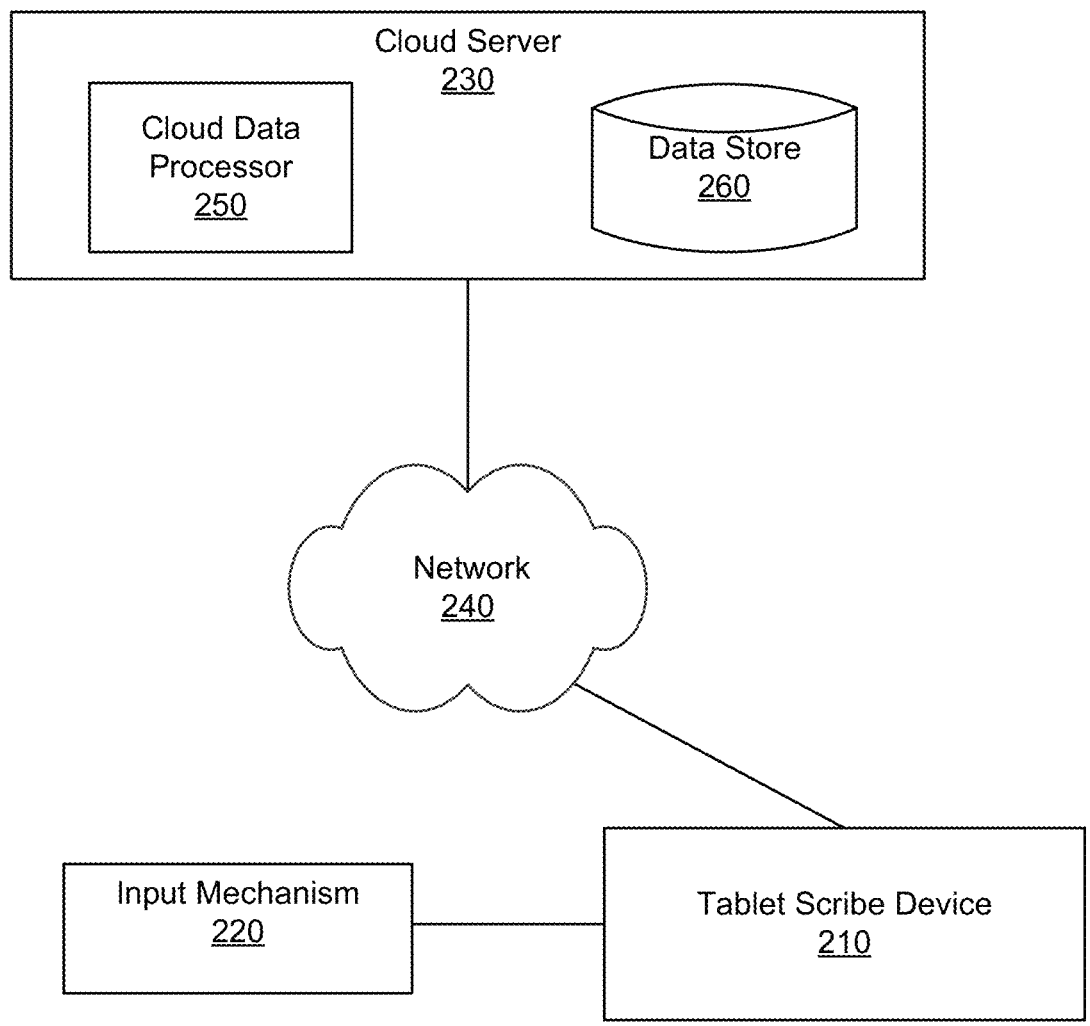
FIG. 2 illustrates a system architecture for a scribe system for transcribing content on a screen based on user input, according to one example embodiment.

In this example, FIG. 10 shows a diagrammatic representation of a machine in the example form of a computer system 1000 within which program code (e.g., software) for causing the machine to perform any one or more of the methodologies discussed herein may be executed. The tablet scribe device 210 may include some or all of the components of the computer system 1000. The program code may be comprised of instructions 1024 executable by one or more processors 1002. In the tablet scribe system 210, the instructions may correspond to the functional components described in FIGS. 2-4 and the steps illustrated in FIGS. 5A-9B.

While the embodiments described herein are in the context of the tablet scribe system 210, it is noted that the principles may apply to other touch sensitive devices. In those contexts, the machine of FIG. 10 may be a server computer, a client computer, a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes one or more processors 1002 (e.g., a central processing unit (CPU), one or more graphics processing units (GPU), one or more digital signal processors (DSP), one or more application specific integrated circuits (ASICs), one or more radio-frequency integrated circuits (RFICs), or any combination of these), a main memory 1004, and a static memory 1006, which are configured to communicate with each other via a bus 608. The computer system 1000 may further include visual display interface 1010. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1010 may include or may interface with a touch enabled screen, e.g. of the tablet scribe system 210 and may be associated with the display system 330. The computer system 1000 may also include alphanumeric input device 1012 (e.g., a keyboard or touch screen keyboard), a cursor control device 1014 (e.g., a mouse, a trackball, a joystick, a motion sensor, or other pointing instrument), a storage unit 1016, a signal generation device 1018 (e.g., a speaker), and a network interface device 1020, which also are configured to communicate via the bus 608.

The storage unit 1016 includes a machine-readable medium 1022 on which is stored (or encoded) instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a network 626 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but not be limited to, data repositories in the form of solid-state memories, optical media, and magnetic media.

The computer system 1000 also may include the one or more sensors 1025. Also note that a computing device may include only a subset of the components illustrated and described with FIG. 10. For example, an IoT device may only include a processor 1002, a small storage unit 1016, a main memory 1004, a visual interface 1010, a network interface device 1020, and a sensor 1025.

V. Additional Considerations

It is to be understood that the figures and descriptions of the present disclosure have been simplified to illustrate elements that are relevant for a clear understanding of the present disclosure, while eliminating, for the purpose of clarity, many other elements found in a typical system. Those of ordinary skill in the art may recognize that other elements and/or steps are desirable and/or required in implementing the present disclosure. However, because such elements and steps are well known in the art, and because they do not facilitate a better understanding of the present disclosure, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable storage medium comprising stored instructions, which when executed by at least one processor, causes the processor to:
    access a graphic outlined by a plurality of contour lines, wherein each contour line of the plurality of contour lines comprises one or more points on a boundary of the graphic;
    for each contour line of the plurality of contour lines, generate a centerline for the contour line;
        determine a distance between each point of the contour line and a corresponding point on the centerline;
        smoothen a shape of the contour line by adjusting a position of each point on the contour line within a threshold distance of the corresponding point on the centerline to a position of the corresponding point on the centerline; and
        replace a pointed edge of the smoothened contour line with a continuous curve to generate a complete contoured representation of the graphic.

2. The non-transitory computer readable medium of claim 1, wherein the graphic is a raster graphic comprising a plurality of pixels, further comprising stored instructions that when executed cause the processor to:
    identify a line segment representing a boundary of each pixel of the plurality of pixels representing a contrast between a shaded pixel of the raster graphic and a white pixel of the raster graphic; and
    connect each identified line segment to generate a boundary of the raster graphic.

3. The non-transitory computer readable medium of claim 2, further comprising stored instructions that when executed cause the processor to:
    compare a slope of a first neighboring line segment to a slope of a second neighboring line segment to determine a level of similarity, the second neighboring line segment adjacent to the first neighboring line segment;
    compare the level of similarity to a threshold level of similarity; and
    generate a set of neighboring line segments that includes the first neighboring line segment and the second neighboring line segment in response to the level of similarity exceeding the threshold level of similarity.

4. The non-transitory computer readable medium of claim 3, further comprising stored instructions that when executed cause the processor to:
    generate a first set of neighboring line segments and a second set of neighboring line segments in response to the level of similarity not satisfying the threshold level of similarity, wherein the first set includes the first neighboring line segment and the second set includes the second neighboring line segment; and
generate a first contour line to replace the first set of neighboring line segments and a second contour line to replace the second set of neighboring line segments.

5. The non-transitory computer readable medium of claim 1, further comprising stored instructions that when executed cause the processor to:
for each contour line of the plurality of contour lines,
identify a set of neighboring points on each contour line positioned in a straight line, the set of neighboring points comprising a start point, an end point, and a plurality of midpoints;
remove the midpoints from the set of neighboring points; and
generate an updated contour line that replaces the start point and the end point.

6. The non-transitory computer readable medium of claim 1, wherein the instructions to replace the pointed edge of the smoothened contour line with a continuous curve further comprises instructions that cause the processor to:
identify a line segment of the boundary that has not been replaced with the contour line;
determine a point representative of the identified line segment, a first point on a contour line behind the determined point, and a second point on a contour line ahead of the determined point;
determine a tangent line of the determined point based on the first point and the second point;
generate a first spline control point on the tangent line at a distance proportional to a distance between the first point and the determined point and a second spline control point on the tangent line at a distance proportional to a distance between the second point and the determined point; and
generate a curved representation of the identified line segment by connecting the first spline control point to the first point and the second spline control point to the second point.

7. A system for generating a vector graphic, the system comprising:
a pixel data converter configured to access a graphic outlined by a plurality of contour lines, wherein each contour line of the plurality of contour lines comprises one or more points on a boundary of the graphic;
a segment refinement module configured to:
generate a centerline for the contour line;
determine a distance between each point of the contour line and a corresponding point on the centerline;
smoothen a shape of the contour line by adjusting a position of each point on the contour line within a threshold distance of the corresponding point on the centerline to a position of the corresponding point on the centerline; and
replace a pointed edge of the smoothened contour line with a continuous curve to generate a complete contoured representation of the graphic; and
a curve conversion module configured to replace a pointed edge of the smoothened contour line with a continuous curve to generate a complete contoured representation of the graphic.

8. The system of claim 7, wherein the graphic is a raster graphic comprising a plurality of pixels, the pixel data converter further configured to:
identify a line segment representing a boundary of each pixel of the plurality of pixels representing a contrast between a shaded pixel of the raster graphic and a white pixel of the raster graphic; and
connect each identified line segment to generate a boundary of the raster graphic.

9. The system of claim 8, further configured to:
compare a slope of a first neighboring line segment to a slope of a second neighboring line segment to determine a level of similarity, the second neighboring line segment adjacent to the first neighboring line segment;
compare the level of similarity to a threshold level of similarity; and
generate a set of neighboring line segments that includes the first neighboring line segment and the second neighboring line segment in response to the level of similarity exceeding the threshold level of similarity.

10. The system of claim 9, further configured to:
generate a first set of neighboring line segments and a second set of neighboring line segments in response to the level of similarity not satisfying the threshold level of similarity, wherein the first set includes the first neighboring line segment and the second set includes the second neighboring line segment; and
generate a first contour line to replace the first set of neighboring line segments and a second contour line to replace the second set of neighboring line segments.

11. The system of claim 7, wherein the segment refinement module is further configured to:
for each contour line of the plurality of contour lines,
identify a set of neighboring points on each contour line positioned in a straight line, the set of neighboring points comprising a start point, an end point, and a plurality of midpoints;
remove the midpoints from the set of neighboring points; and
generate an updated contour line that replaces the start point and the end point.

12. The system of claim 7, wherein the curve conversion module is further configured to:
identify a line segment of the boundary that has not been replaced with the contour line;
determine a point representative of the identified line segment, a first point on a contour line behind the determined point, and a second point on a contour line ahead of the determined point;
determine a tangent line of the determined point based on the first point and the second point;
generate a first spline control point on the tangent line at a distance proportional to a distance between the first point and the determined point and a second spline control point on the tangent line at a distance proportional to a distance between the second point and the determined point; and
generate a curved representation of the identified line segment by connecting the first spline control point to the first point and the second spline control point to the second point.

13. A method for generating a vector graphic, the method comprising:
access a graphic outlined by a plurality of contour lines, wherein each contour line of the plurality of contour lines comprises one or more points on a boundary of the graphic;
for each contour line of the plurality of contour lines,
generating a centerline for the contour line;
determining a distance between each point of the contour line and a corresponding point on the centerline;

smoothen a shape of the contour line by adjusting a position of each point on the contour line within a threshold distance of the corresponding point on the centerline to a position of the corresponding point on the centerline; and replacing a pointed edge of the smoothened contour line with a continuous curve to generate a complete contoured representation of the graphic.

14. The method of claim 13, wherein the graphic is a raster graphic comprising a plurality of pixels, the method further comprising:

identifying a line segment representing a boundary of each pixel of the plurality of pixels representing a contrast between a shaded pixel of the raster graphic and a white pixel of the raster graphic; and connecting each identified line segment to generate a boundary of the raster graphic.

15. The method of claim 14, wherein generating each contour line of the plurality of contour lines comprises:

comparing a slope of a first neighboring line segment to a slope of a second neighboring line segment to determine a level of similarity, the second neighboring line segment adjacent to the first neighboring line segment;

comparing the level of similarity to a threshold level of similarity; and generating a set of neighboring line segments that includes the first neighboring line segment and the second neighboring line segment in response to the level of similarity exceeding the threshold level of similarity.

16. The method of claim 13, further comprising:

for each contour line of the plurality of contour lines, identifying a set of neighboring points on each contour line positioned in a straight line, the set of neighboring points comprising a start point, an end point, and a plurality of midpoints;

removing the midpoints from the set of neighboring points; and generating an updated contour line that replaces the start point and the end point.

17. The method of claim 13, wherein replacing the pointed edge of the smoothened contour line with a continuous curve comprises:

identifying a line segment of the boundary that has not been replaced with the contour line;

determining a point representative of the identified line segment, a first point on a contour line behind the determined point, and a second point on a contour line ahead of the determined point;

determining a tangent line of the determined point based on the first point and the second point;

generating a first spline control point on the tangent line at a distance proportional to a distance between the first point and the determined point and a second spline control point on the tangent line at a distance proportional to a distance between the second point and the determined point; and generating a curved representation of the identified line segment by connecting the first spline control point to the first point and the second spline control point to the second point.

* * * * *

UNITED STATES PATENT AND TRADEMARK OFFICE
CERTIFICATE OF CORRECTION

PATENT NO. : 11,676,313 B2
APPLICATION NO. : 17/500897
DATED : June 13, 2023
INVENTOR(S) : Sandsmark et al.

It is certified that error appears in the above-identified patent and that said Letters Patent is hereby corrected as shown below:

In the Claims

In Column 12, in Claim 2, Line 39, delete "medium" and insert -- storage medium --, therefor.

In Column 12, in Claim 3, Line 49, delete "medium" and insert -- storage medium --, therefor.

In Column 12, in Claim 4, Line 62, delete "medium" and insert -- storage medium --, therefor.

In Column 13, in Claim 5, Line 7, delete "medium" and insert -- storage medium --, therefor.

In Column 13, in Claim 6, Line 19, delete "medium" and insert -- storage medium --, therefor.

Signed and Sealed this
Fifteenth Day of August, 2023

Katherine Kelly Vidal
*Director of the United States Patent and Trademark Office*